(12) United States Patent
Takada et al.

(10) Patent No.: US 6,968,080 B2
(45) Date of Patent: Nov. 22, 2005

(54) METHOD AND APPARATUS FOR GENERATING PART PROGRAMS FOR USE IN IMAGE-MEASURING INSTRUMENTS, AND IMAGE-MEASURING INSTRUMENT AND METHOD OF DISPLAYING MEASURED RESULTS THEREFROM

(75) Inventors: Akira Takada, Kawasaki (JP); Kozo Ariga, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 716 days.

(21) Appl. No.: 09/852,326

(22) Filed: May 10, 2001

(65) Prior Publication Data
US 2001/0040995 A1 Nov. 15, 2001

(30) Foreign Application Priority Data
May 10, 2000 (JP) .............................. 2000-137405

(51) Int. Cl.$^7$ .............................................. G06K 9/00
(52) U.S. Cl. ...................... 382/152; 382/199; 382/203; 356/495; 702/167
(58) Field of Search ................................ 382/152, 153, 382/203, 291, 199; 702/155, 156, 158, 167; 706/45, 46, 47; 356/495, 496, 600, 394, 625, 356/601; 700/182, 175, 173, 174; 250/251.1, 250/559.08, 559.33; 451/9, 6

(56) References Cited

U.S. PATENT DOCUMENTS

| | | | | |
|---|---|---|---|---|
| 5,579,444 A | * | 11/1996 | Dalziel et al. | ............... 700/259 |
| 5,590,060 A | * | 12/1996 | Granville et al. | ............ 702/155 |
| 5,825,017 A | * | 10/1998 | Pryor | ....................... 250/208.1 |
| 5,871,391 A | * | 2/1999 | Pryor | ............................ 451/9 |
| 5,995,663 A | | 11/1999 | Itsuzaki et al. | |
| 6,542,180 B1 | * | 4/2003 | Wasserman et al. | ........ 348/131 |

FOREIGN PATENT DOCUMENTS

| | | |
|---|---|---|
| EP | 1 031 942 A2 | 8/2000 |
| JP | A 4-302370 | 10/1992 |
| JP | A 6-67863 | 3/1994 |
| JP | A 6-175813 | 6/1994 |

(Continued)

OTHER PUBLICATIONS

M.Marefat " A framework for image interpretation in manufacturing applications ", IEEE, 1990 , pp. 571-574.*

Primary Examiner—Kanjibhai Patel
Assistant Examiner—Sheela Chawan
(74) Attorney, Agent, or Firm—Oliff & Berridge, PLC

(57) ABSTRACT

A method of generating a part program for use in an image-measuring system and in an image-measuring instrument is provided. The method can be employed easily by an operator without complicated operations to efficiently generate a part program for a CNC image-measuring instrument. This method facilitates the operator to visually identify a work to be measured, through reading CAD data of the work; setting measurement conditions and a positioning coordinate system; calculating a size of the work when it is practically imaged; and displaying an image of the CAD data with the same size. Then, through setting tolerance information; and selecting an objective graphic to be measured, an edge detection tool is placed for a graphic element of the objective graphic selected. Further, through performing a process to accommodate as many edge detection tools in a determination circle as possible; generating a part program only requiring the least stage movements; performing a practical measurement; checking an image obtained from the measured data with an image obtained from the CAD data, information such as an error from a design value can be displayed on a screen.

18 Claims, 16 Drawing Sheets

FOREIGN PATENT DOCUMENTS

| | | |
|---|---|---|
| JP | A 8-247719 | 9/1996 |
| JP | A 8-314997 | 11/1996 |
| JP | A 9-62327 | 3/1997 |
| JP | A 10-78317 | 3/1998 |
| JP | A 11-63922 | 3/1999 |
| JP | A 11-203485 | 7/1999 |
| JP | B2 2947367 | 7/1999 |
| WO | WO 00/12964 | 3/2000 |

* cited by examiner

F I G. 1
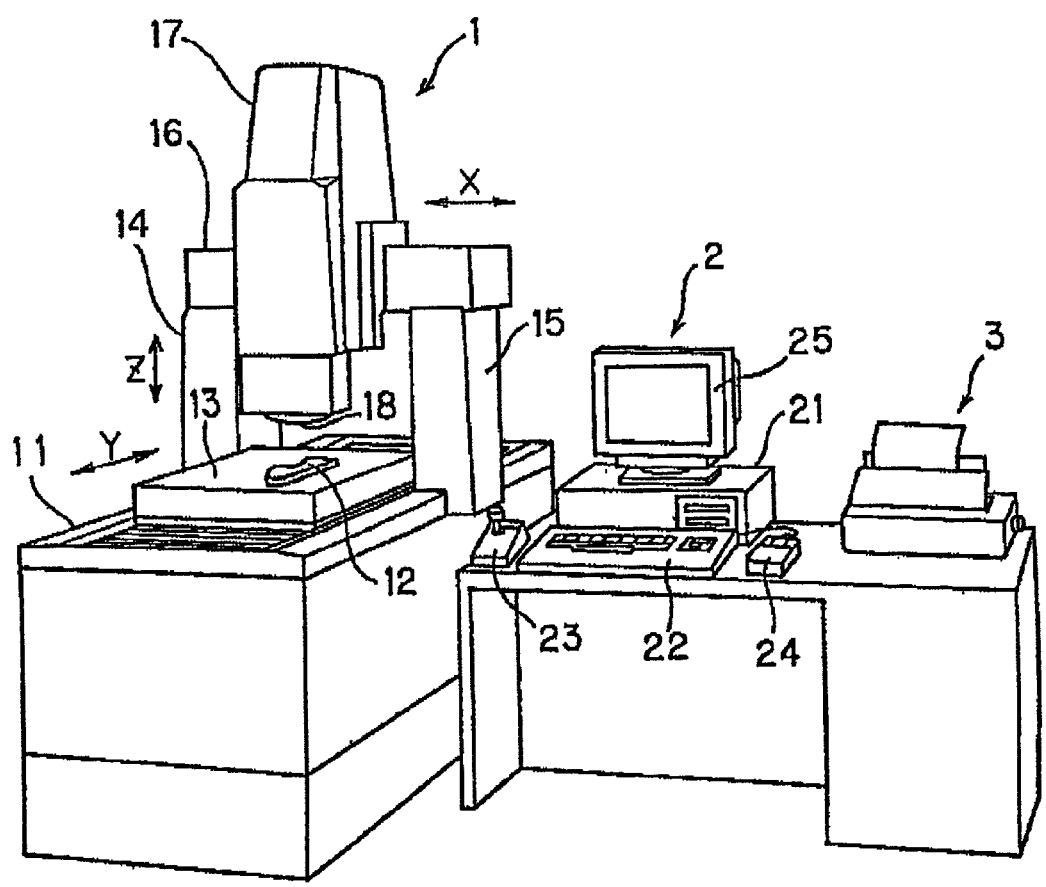

FIG. 6
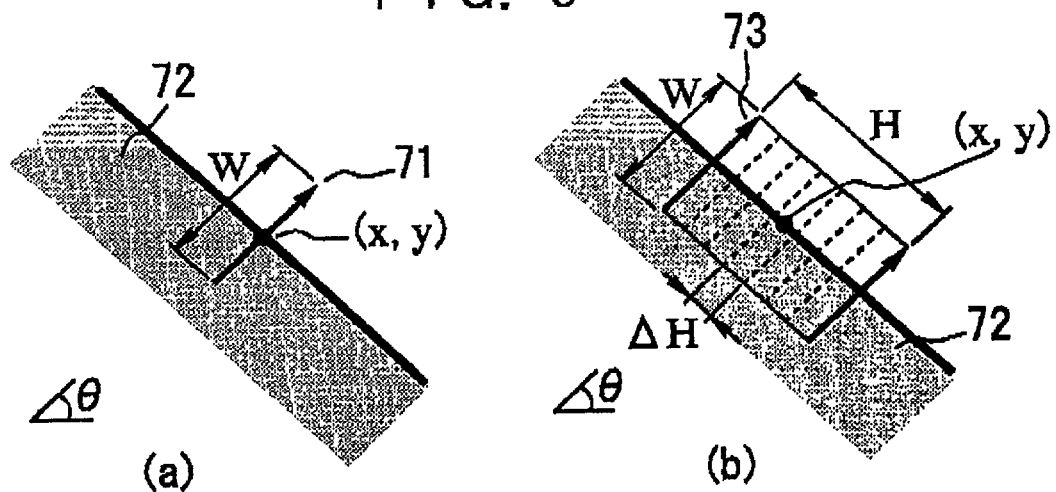
FIG. 7
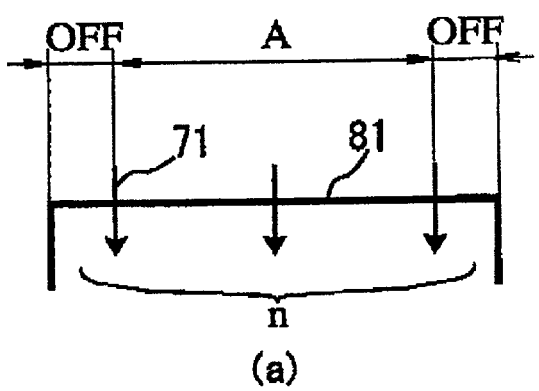
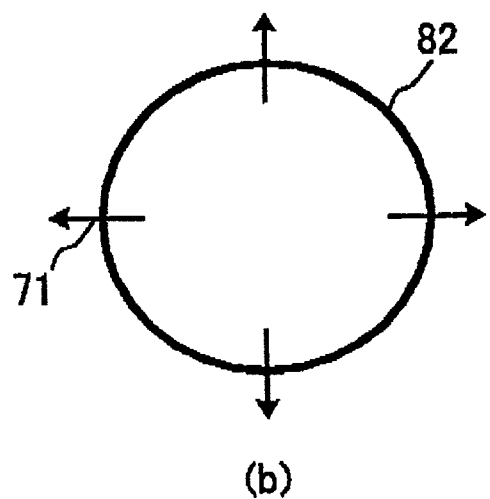

FIG. 8

PRIMARY CANDIDATE

| GRAPHIC ELEMENT | TOOL TYPE | NUMBER OF TOOLS | LENGTH:W(pixel) | OFFSET:OFF(%) |
|---|---|---|---|---|
| LINE | 2 | 3 | 20 | 10 |
| CIRCLE | 1 | 4 | 20 | - |
| CIRCULAR ARC | 1 | 3 | 20 | 10 |

SECONDARY CANDIDATE

| GRAPHIC ELEMENT | TOOL TYPE | NUMBER OF TOOLS | LENGTH:W(pixel) | OFFSET:OFF(%) |
|---|---|---|---|---|
| LINE | 1 | 3 | 15 | 10 |
| CIRCLE | 2 | 4 | 15 | - |
| CIRCULAR ARC | 2 | 3 | 15 | 10 |

FIG. 9
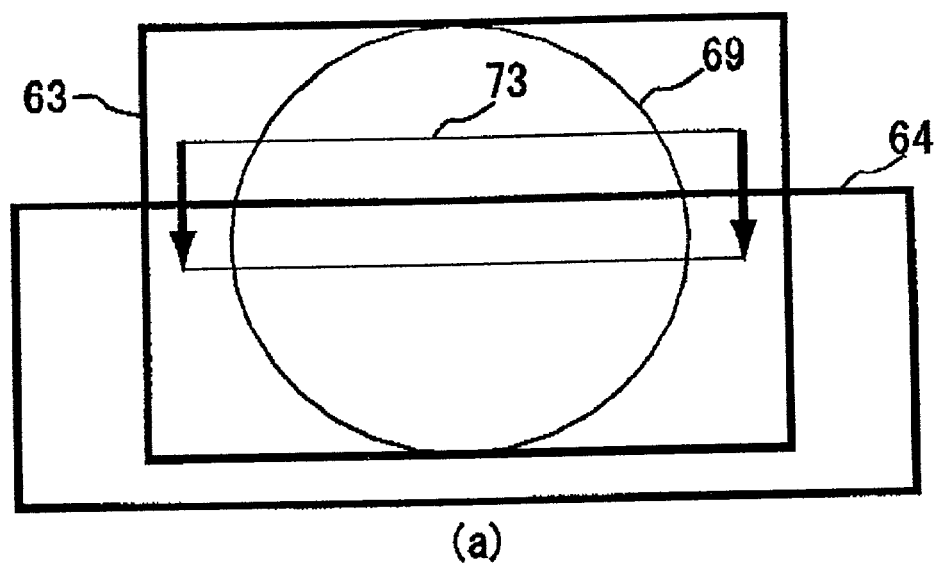
(a)
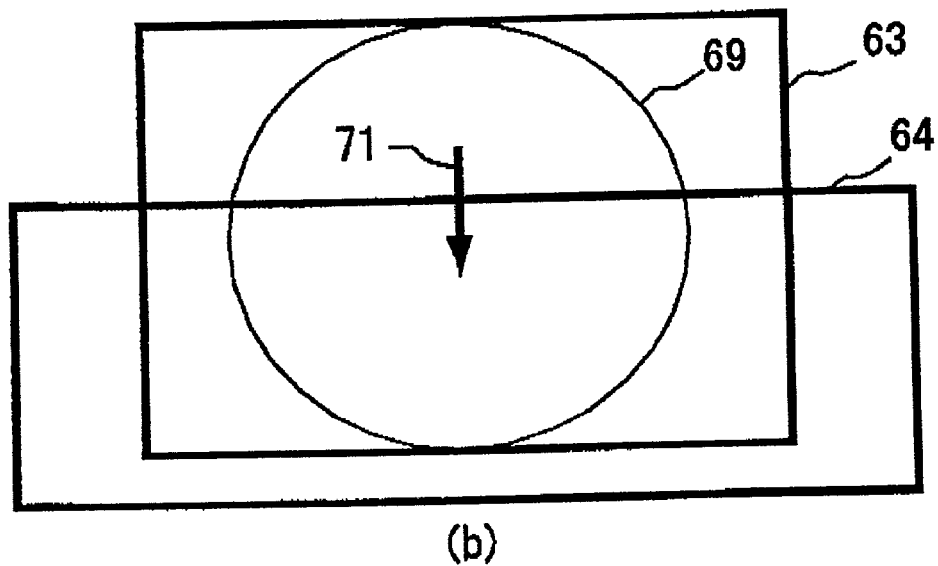
(b)

FIG. 11
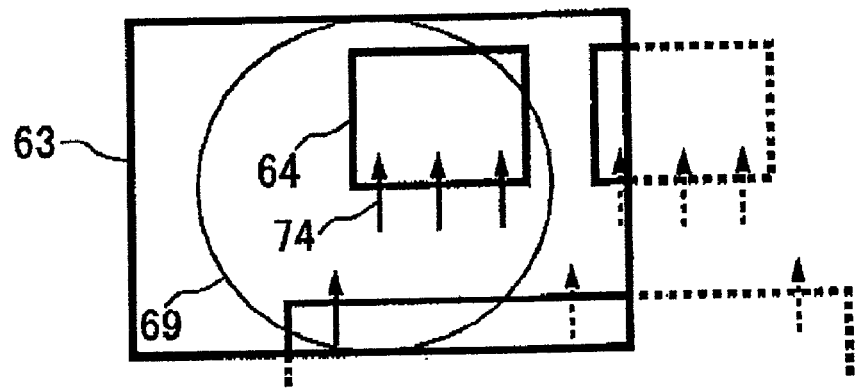
(a)
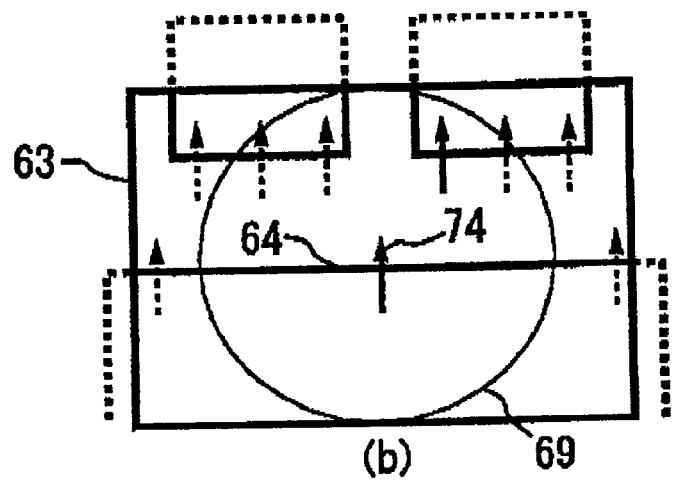
(b)
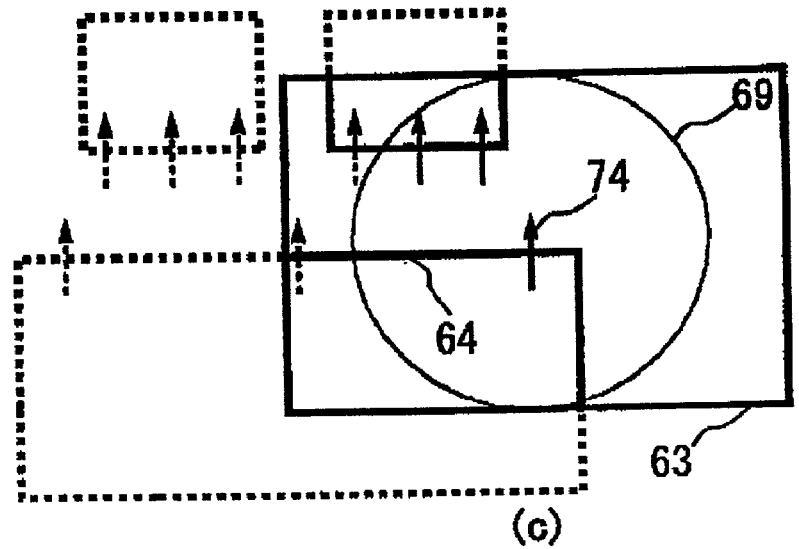
(c)

METHOD AND APPARATUS FOR GENERATING PART PROGRAMS FOR USE IN IMAGE-MEASURING INSTRUMENTS, AND IMAGE-MEASURING INSTRUMENT AND METHOD OF DISPLAYING MEASURED RESULTS THEREFROM

BACKGROUND OF THE INVENTION

1. Field of the Invention

The present invention relates to a method and apparatus for generating part programs for use in image-measuring instruments. The method and apparatus utilizes an offline teaching system that can offline generate part programs together for an image-measuring instrument, without the use of a real machine, easily and automatically based on the shape data of an object to be measured. The present invention also relates to an image-measuring instrument and method of displaying measured results therefrom.

2. Description of the Related Art

In offline teaching for a CNC (computerized numerical controlled) image-measuring instrument in the art, a part program is generated through displaying two-dimensional CAD data on a screen; then pointing a graphic element (a position to be measured) by an operator using a mouse and the like; and individually determining which edge detection tool is employed.

The CAD data include line segments, circles, circular arcs, and complicated data such as ellipses and free curves. In addition, there are various types in the edge detection tools. Therefore, selection of the use of an edge detection tool suitable for a unique graphic element is difficult and causes individual differences in the measurement time and accuracy depending on experiences of operators. It also requires many operations to generate a part program and is time-consuming.

Furthermore, modification of the part program once generated, for example, appropriate adjustment of the position, direction or width thereof is difficult and hardly performed later. Accordingly, it is required to generate a new part program when such the modification is performed, causing a disadvantage to lack flexibility and generality.

The present invention has been made in consideration of the above and accordingly has an object to provide a method and apparatus for generating part programs for use in image-measuring instruments. The method and apparatus can be employed easily by an operator without complicated operations to efficiently generate a part program for a CNC image-measuring instrument. The present invention also provides an image-measuring instrument and method of displaying measured results therefrom.

SUMMARY OF THE INVENTION

The present invention is provided with an apparatus for generating a part program with description of measurement procedures to be used in an image-measuring instrument for measuring a work based on image data obtained by imaging the work. The apparatus comprises a work data input means for reading work data (CAD data or image data) of the work; a display means for graphically displaying the work data read by the input means; a graphic selection means for selecting a graphic corresponding to an element to be measured in the work among the work data displayed by the display means; a measurement condition setting means for previously setting measurement conditions containing a generation condition on an edge detection tool applicable to each graphic type; and a part program generation means for generating an edge detection tool corresponding to the each selected graphic based on the measurement conditions set in the setting means, and for generating a part program containing an edge detection command by the generated edge detection tool.

A certain determination technique may be applied to the part program generation means. For example, it determines a position and direction of the edge detection tool based on vector data of the each selected graphic, and determines a length and number of the edge detection tool(s) based on an edge detection tool generation condition with respect to that graphic.

The apparatus according to the present invention may further comprise an editing means for editing the edge detection tool placed by the generated part program. In this case, the display means may graphically display the work data by the same magnification as that of an image to be imaged during an operation of editing the edge detection tool by the editing means.

In an aspect, the measurement condition setting means may set tolerance information for tolerance checking per the element to be measured, and the part program generation means may record tolerance information for tolerance checking in the part program based on the tolerance information set by the measurement condition setting means.

In another aspect, the measurement condition setting means may set an auto-focus execution condition for allowing the image-measuring instrument to execute an auto-focusing operation, and the part program generation means may record an auto-focus command in the part program based on the auto-focus execution condition set by the measurement condition setting means.

The part program generation means may set a determination area, for generating an edge detection tool, in a display area for image information obtained by practically imaging the work. Then, it describes the edge detection command based on the generated edge detection tool in the part program only if an edge detection tool generated in accordance with the edge detection tool generation condition set by the measurement condition setting means is contained in the determination area. Otherwise, it alarm displays and terminates to generate edge detection tools if the generated edge detection tool is not contained in the determination area.

The measurement condition setting means may set primary and secondary candidates of edge detection tools generated per each graphic type as edge detection tool generation conditions. The part program generation means may set a determination area, for generating an edge detection tool, in a display area for image information obtained by practically imaging the work. It describes the edge detection command based on the generated edge detection tool in the part program only if an edge detection tool generated in accordance with the primary candidate of the edge detection tool generation condition set by the measurement condition setting means is contained in the determination area. Otherwise, it generates the edge detection tool of the secondary candidate if the generated edge detection tool is not contained in the determination area.

The part program generation means may be provided with an additional function to generate a part program when a plurality of edge detection tools are contained in a certain determination area set in a display area for image information obtained by practically imaging the work. The part program is to allow the plurality of edge detection tools to successively execute edge detection commands without any stage movement in the image-measuring instrument.

The part program generation means may generate a part program containing a stage movement command that allows the greatest number of edge detection tools to be contained in the determination area.

The present invention is also provided with a method of generating a part program with description of measurement procedures to be used in an image-measuring instrument for measuring a work based on image data obtained by imaging the work. The method comprises reading work data (CAD data or image data) of the work; graphically displaying the work data read; generating an edge detection tool, for a graphic corresponding to an element to be measured in the work selected by a selection operation among the work data displayed, based on the measurement conditions containing a generation condition on an edge detection tool applicable to each graphic type previously set; and generating a part program containing an edge detection command by the generated edge detection tool.

The present invention is further provided with a medium for recording a part program generator for generating a part program with description of measurement procedures to be used in an image-measuring instrument for measuring a work based on image data obtained by imaging the work. The part program generator comprises the steps of: reading work data (CAD data or image data) of the work; graphically displaying the work data read at the step of reading; selecting a graphic corresponding to an element to be measured in the work among the work data displayed at the step of displaying; previously setting measurement conditions containing a generation condition on an edge detection tool applicable to each graphic type; and generating an edge detection tool corresponding to the each selected graphic based on the measurement conditions set at the step of setting, and generating a part program containing an edge detection command by the generated edge detection tool.

The present invention is yet further provided with a

Program of generating a part program with description of measurement procedures to be used in an image-measuring instrument for measuring a work based on image data obtained by imaging the work. The part program generator comprises the steps of: reading work data of the work; graphically displaying the work data read at the step of reading; selecting a graphic corresponding to an element to be measured in the work among the work data displayed at the step of displaying; previously setting measurement conditions containing a generation condition on an edge detection tool applicable to each graphic type; and generating an edge detection tool corresponding to the each selected graphic based on the measurement conditions set at the step of setting, and generating a part program containing an edge detection command by the generated edge detection tool.

The present invention is provided with an image-measuring instrument for measuring a work based on image data obtained by imaging the work. The image-measuring instrument comprises a part program input means for reading a part program with description of measurement procedures containing CAD data corresponding to the work; a part program execution means for executing the part program read by the part program input means to obtain a measured result for each element to be measured in the work; a graphic information generation means for generating graphic information of the measured result for each element to be measured, based on the measured result obtained by the part program execution means; and a display means for displaying graphic information of the measured result generated by the graphic information generation means and graphic information as a design value in the corresponding CAD data, superimposing them in an identifiable form.

The display means numerically may display, in the proximity of the graphic information of the measured result and the graphic information as the design value, error information on both graphic information.

The present invention is also provided with a method of displaying a measured result from an image-measuring instrument for measuring a work based on image data obtained by imaging the work. The method comprises executing a part program with description of measurement procedures containing CAD data corresponding to the work to obtain a measured result for each element to be measured in the work; generating graphic information of the measured result for each element to be measured, based on the measured result; and displaying graphic information of the measured result and graphic information as a design value in the corresponding CAD data, superimposing them in an identifiable form.

The present invention is further provided with a medium for storing a program of displaying measured results from an image-measuring instrument for measuring a work based on image data obtained by imaging the work. The program comprises the steps of: reading a part program with description of measurement procedures containing CAD data corresponding to the work; executing the part program read at the step of reading to obtain a measured result for each element to be measured in the work; generating graphic information of the measured result for the each element to be measured, based on the measured result obtained at the step of executing; and displaying graphic information of the measured result generated at the step of generating and graphic information as a design value in the corresponding CAD data, superimposing them in an identifiable form.

The present invention is yet further provided with a program of displaying measured results from an image-measuring instrument for measuring a work based on image data obtained by imaging the work. The program comprises the steps of reading a part program with description of measurement procedures containing CAD data corresponding to the work; executing the part program at the step of reading to obtain a measured result for each element to be measured in the work; generating graphic information of the measured result for each element to be measured, based on the measured result obtained at the stop of executing; and displaying graphic information of the measured result generated at the step of generating and graphic information as a design value in the corresponding CAD data, superimposing them in an identifiable form.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 1 is a perspective view showing an arrangement of an image-measuring system according to an embodiment of the present invention;

FIG. 6 shows examples of edge detection tools;

FIG. 7 illustrates the setting of measurement conditions;

FIG. 8 illustrates the setting of measurement conditions;

FIG. 9 illustrates process procedures in the image-measuring system according to the embodiment of the present invention;

FIG. 11 illustrates process procedures in the image-measuring system according to the embodiment of the present invention;

DETAILED DESCRIPTION OF THE PREFERRED EMBODIMENTS

Figure 2:
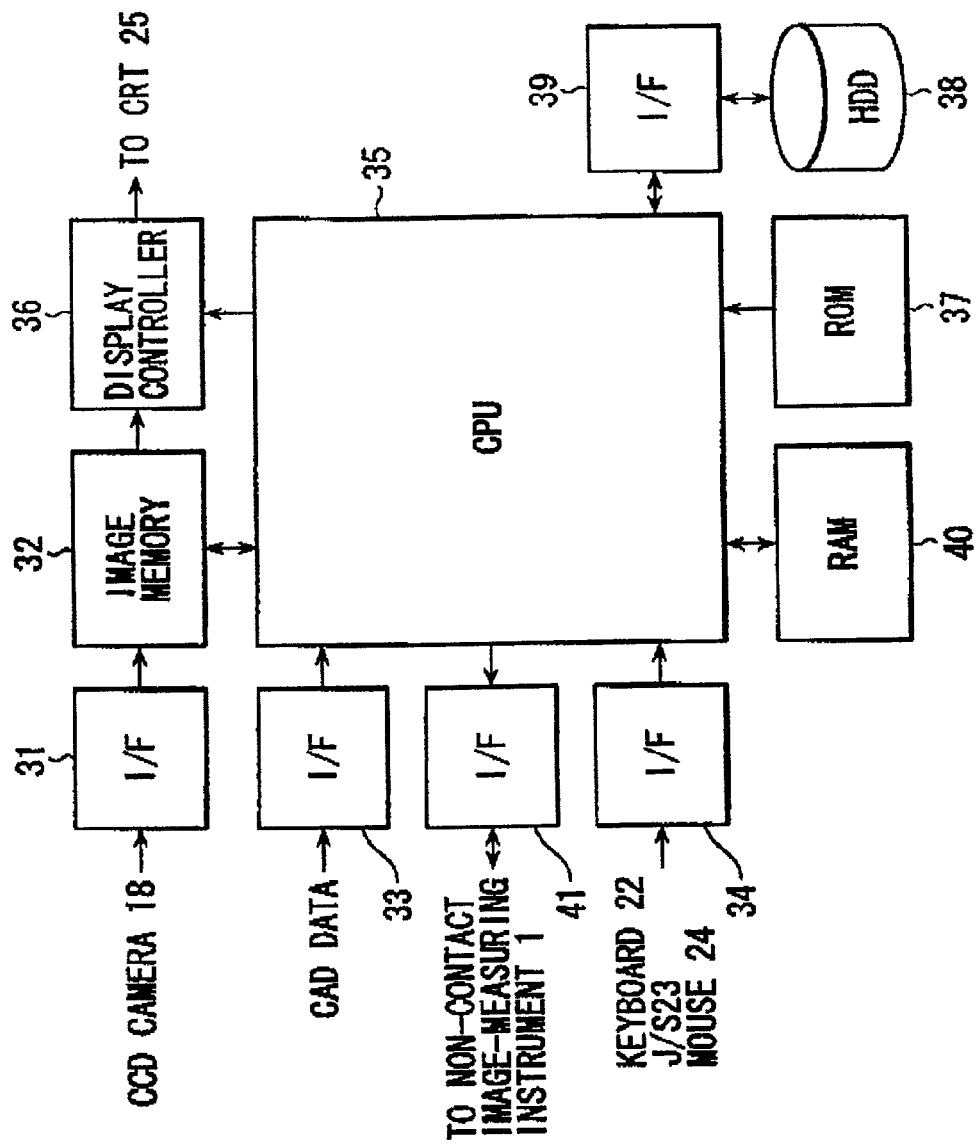
FIG. 2 is a block diagram showing an arrangement of a computer body in the image-measuring system according to the embodiment of the present invention.

Preferred embodiments of the present invention will now be described with reference to the accompanying drawings. FIG. 1 is a perspective view showing the entire arrangement of an image-measuring system according to a first embodiment of the present invention.

The system comprises a non-contact image-measuring instrument 1, a computer system 2 for drive-controlling the non-contact image-measuring instrument 1 and executing necessary data processing, and a printer 3 for printing out measured results.

The non-contact image-measuring instrument 1 has the following arrangement. That is, a measurement table 13 is mounted on a frame 11 and an object to be measured (hereinafter referred to as a "work") 12 is mounted on the measurement table 13. The measurement table 13 is driven in the Y direction from a Y-axis driving mechanism not depicted. Support arms 14, 15 are secured on the center portions of both sides of the frame 11, extending upwardly therefrom. An X-axis guide 16 is secured on both upper ends of the support arms 14, 15 to link between them. An imaging unit 17 is supported on the X-axis guide 16. The imaging unit 17 is driven along the X-axis guide 16 from an X-axis driving mechanism not depicted. A CCD camera 18 is mounted on the lower surface of the imaging unit 17, opposing to the measurement table 13. In addition, the imaging unit 17 contains an illumination device, a focusing mechanism and a z-axis driving mechanism for positioning the CCD camera 18 in the Z direction, though they are not depicted.

The computer system 2 comprises a computer body (the main unit) 21, a keyboard 22, a joystick box (hereinafter referred to as "J/S") 23, a mouse 24 and a CRT display 25.

The computer body 21 has an arrangement as shown in FIG. 2, for example. That is, image information input from the CCD camera 18 is stored in an image memory 32 through an interface (hereinafter referred to as "I/F") 31.

CAD data of the work 12 employed during offline teaching is generated by a CAD system not depicted, then input into a CPU 35 via an I/F 33, thereafter developed in bitmap image information at the CPU 35 and finally stored in the image memory 32. The CAD data may also be stored once in a hard disc drive (hereinafter referred to as "HDD") 38 and the CAD data output from the HDD 38 is developed in bitmap image information at the CPU 35 and then stored in the image memory 32 similarly. The image information stored in the image memory 32 is displayed on the CRT display 25 through a display controller 36.

Code information and positional information input from the keyboard 22, J/S 23 and mouse 24 are on the other hand introduced into the CPU 35 via an I/F 34. The CPU 35 executes a process for generating a part program, a process for executing a measurement based on the part program, and a process for displaying a measured result. These processes are executed in accordance with microprograms stored in a ROM 37, and with a part program generator, a measurement execution program and a measured result display program all stored in a RAM 40 via an I/F 39 from the HDD 38. The CPU 35 controls the non-contact image-measuring instrument 1 via an I/F 41 in the measurement executing process. The HDD 38 Stores the CAD data for use in offline teaching and the part programs generated. The RAM 40 stores various programs and provides work areas for various processes.

Figure 3:
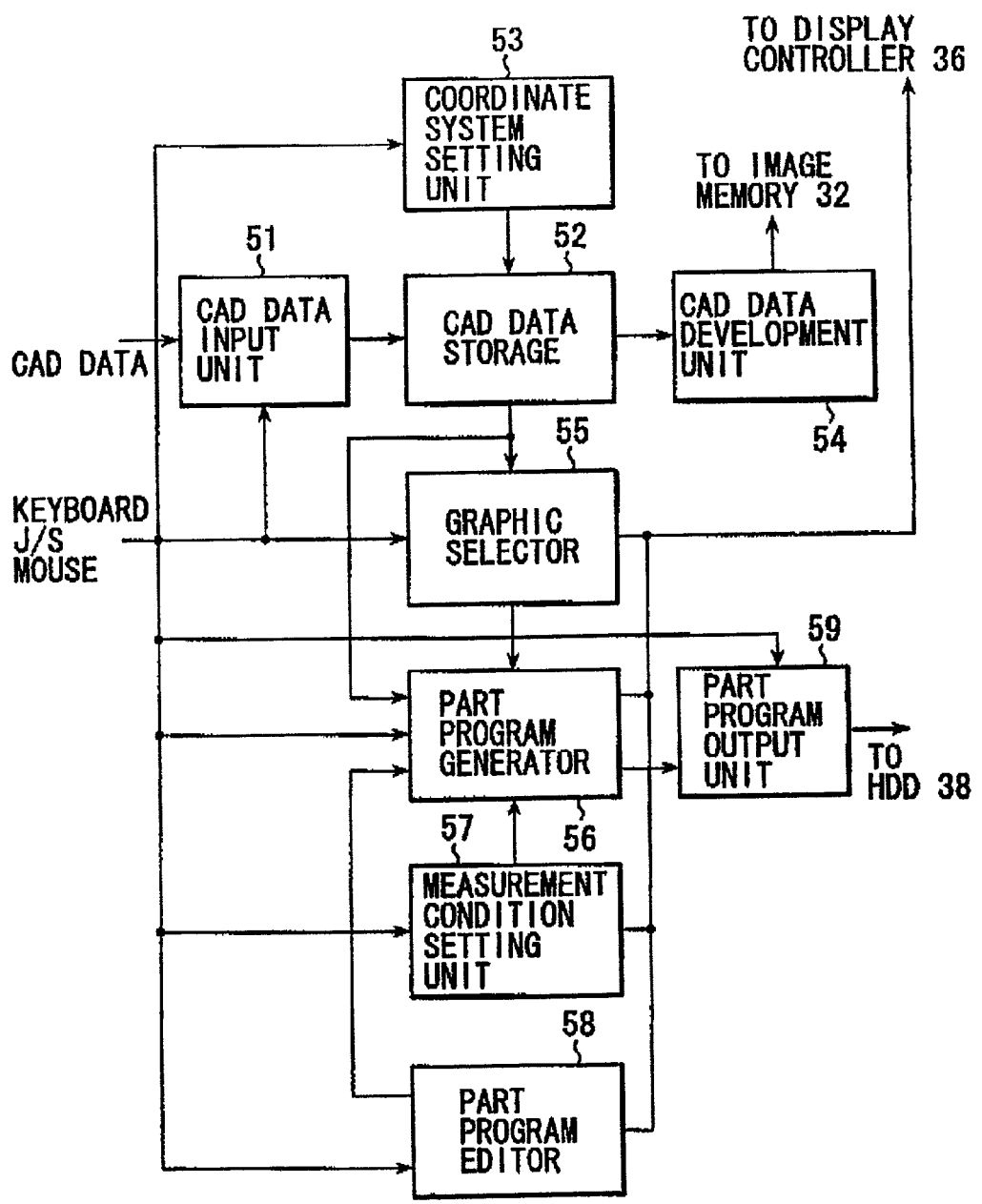
FIG. 3 is a functional block diagram of an apparatus for generating a part program in the above system.

FIG. 3 is a functional block diagram of an apparatus for generating a part program, according to offline teaching, realized from the part program generator, the CPU 35 and their periphery circuits.

CAD data, created as a design drawing of the work 12, is read at CAD data input unit 51. The CAD data input unit 51 converts the CAD data with a designated magnification into a designated reading format (for example, DXF or IGES), based on operations of the keyboard 22, the mouse 24 and the like, prior to reading the CAD data. The CAD data, magnified and read, is stored in CAD data storage 52. A coordinate system setting unit 53 executes a coordinate system setting process for matching a coordinate system for the CAD data stored in the CAD data storage 52 with a work coordinate system. CAD data development unit 54 subjects the CAD data stored in the CAD data storage 52 to vector/raster conversion and then supplies the converted data to the image memory 32. From the CAD data stored in the CAD data storage 52, a graphic selector 55 selects CAD data of a graphic element corresponding to a position to be measured in the work 12, based on the operation of the mouse 24.

A part program generator 56 generates a part program file, which describes measurement procedures for the graphic element selected at the graphic selector 55, based on measurement conditions set at a measurement condition setting unit 57. The part program file generated is subjected to an editing process at a part program editor 58, if required. The part program file, thus generated and edited, is stored in the HDD 38 and the like via a part program output unit 59.

Procedures for generating a part program in the non-contact image-measuring system thus configured will be described next.

Figure 4:
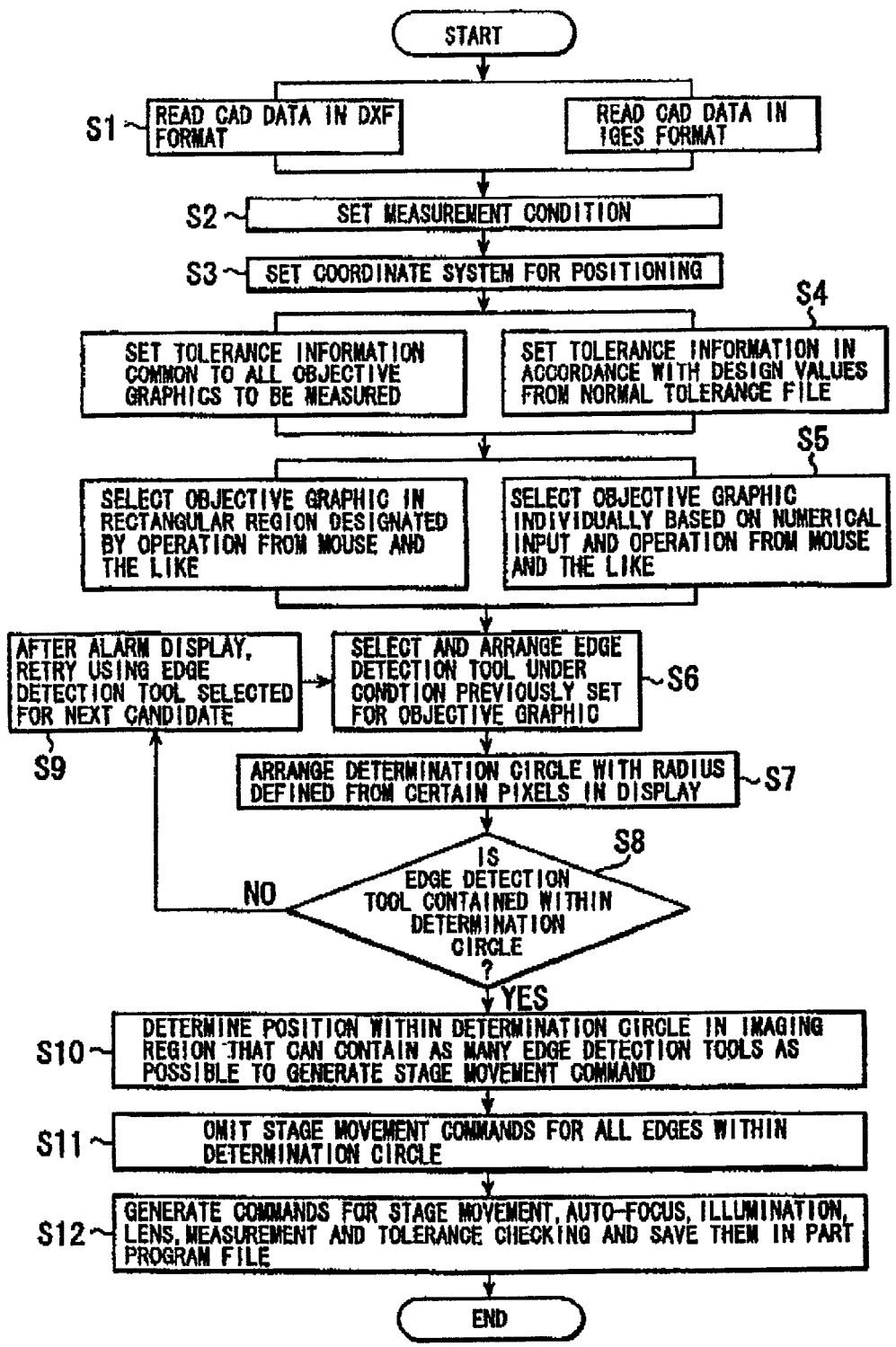
FIG. 4 is a flowchart showing procedures in a process for automatically generating a part program in the above system.

FIG. 4 is a flowchart showing procedures in a process for automatically generating a part program. First, CAD data in DXF or IGES format, previously created for the work 12 using a CAD system, is read and displayed as an image in a graphic window on the CRT display 25 (S1). A magnification can be set for reading the CAD data. Therefore, the reading can be performed independent of a reduced scale of the drawing employed for the CAD data of the work 12.

Figure 5:
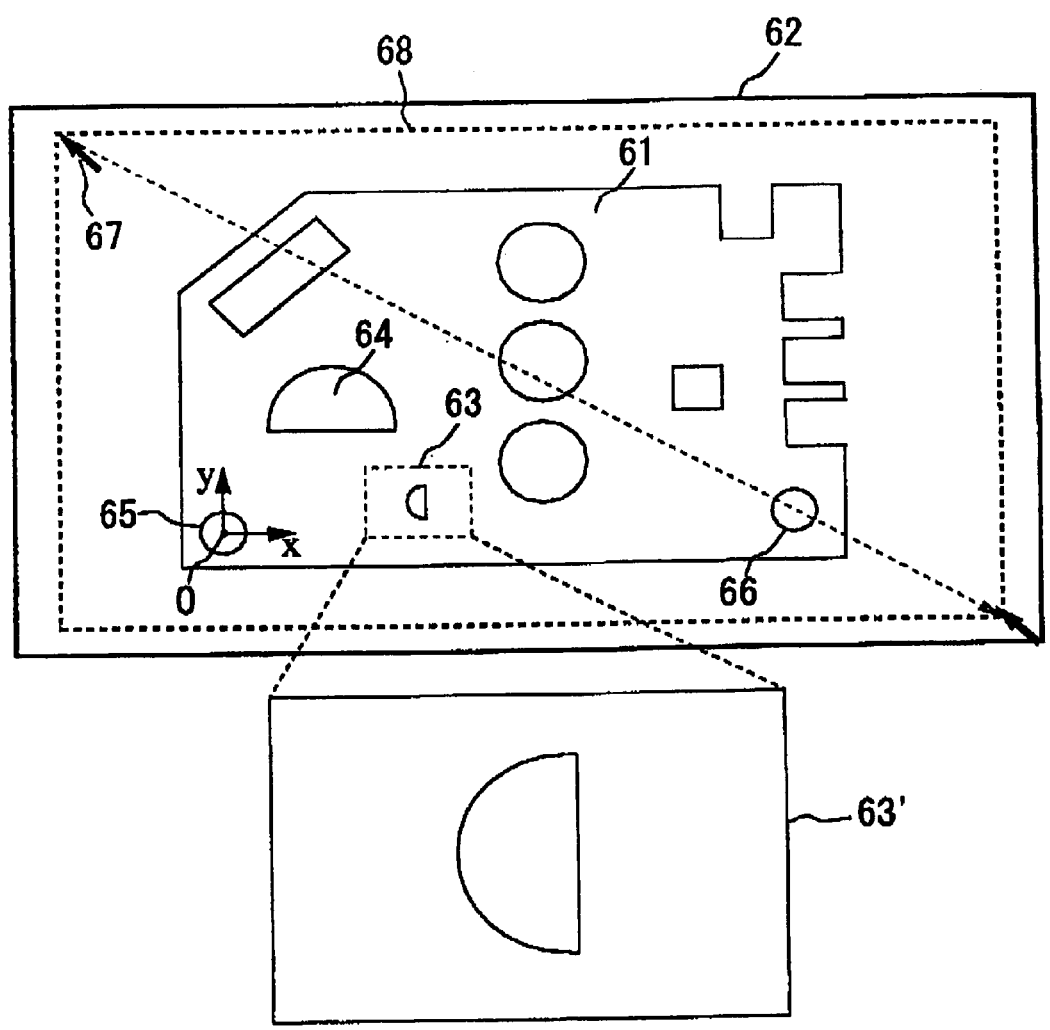
FIG. 5 shows a display example of image information in the above system.

For example, if the CAD data to be read is drawn with a reduced scale of 0.5×, setting of a magnification of 2× for reception makes it possible to read the CAD data of the work 12 already converted in actual size. FIG. 5 shows a display example of image information derived from the CAD data read. The CAD data-derived image information 61 to is displayed in a graphic window 62. A rectangular region 63 displayed with dotted lines in the graphic window 62 indicates an imaging region by the CCD camera 18. The imaging region 63 has a size that is determined from a reduced scale of CAD data, a magnification for reading and a lens power described later. The imaging region 63 can be zoomed up and moved as indicated with the numeral reference 63', if required. To facilitate grasp of the imaging region 63 and recognition and selection of an objective graphic 64 to be measured, the image information 61 is intended not to contain dimension lines, values and so forth in the CAD data.

Settings of measurement conditions are performed next (S2). As for illuminations, settings are performed, for example, on an illumination type such as vertical down illumination, transmission illumination, ring fiber illumination and program-controlled ring illumination, and on a light quantity of the illumination from the darkest (0%) to the brightest (100%). As for lens, settings are performed on lens powers of several lens such as fixed power lens, program-controlled power turret and program-controlled zoom lens. With regard to edge detection tools, settings are performed on types of edge detection tools, the number of edge detection tools to be placed, sizes of edge detection tools and offset values, for example. FIG. 6 shows examples of edge detection tools. FIG. 6A shows the simplest tool (hereinafter referred to as a "simple tool") 71, which is employed to detect an edge point. The edge point is defined as a point that sharply changes the density level of image information 72, which is obtained from the work 12 when it is imaged along the arrow from the base to the tip. The simple tool is defined from positional coordinates of the central point (x, y), a length W and a angle θ. FIG. 6B shows a rectangular box tool (hereinafter referred to as a "boxtool") 73, which is defined from positional information of the central point (x, y), a length W of arrows on both sides, a width H between the arrows and an angle θ. In the case of the box tool 73, the edge detection is repeatedly performed along the arrow from the base toward the tip at an interval ΔH previously set within the width H. Operational processes will be complicated if all parameters of the tools 71, 73 are derived from calculations per graphic element. Then, only positions and tilts of the tools 71, 73 are subjected to calculations for determination per graphic element selected as an object to be measured in order to reduce operational processes.

Therefore, in the setting of measurement conditions, the type(s) of and the number of edge detection tool(s), the length W (the number of pixels), and the number of offsets are only set per type of graphic element (line, circle, circular arc and so forth). FIG. 7A shows an example of setting with respect to a line. In this example, the simple tool 71 is applied, the number n is equal to 3, offsets OFF are respectively set from both ends of the line, and a region A is set for placing the simple tool 71. The setting of the offset OFF is intended to prevent the disablement of edge detection from erroneously occurring when the tool 71 is placed on an end of a line or circular arc. The offset OFF may be set with a length or percent of a line length. FIG. 7B exemplifies an arrangement of four simple tools 71 in relation to a circle 82. No offset is required in the case of a circle.

The contents thus set are shown in FIG. 8. A tool type, the number of tools, a length W and an offset are set per graphic element as an edge detection tool generation condition in a measurement condition setting unit 57. In this example, not only a primary candidate, but a secondary candidate is also set as another tool candidate in case of failing to generate the primary candidate tool.

Offline generation of a part program by the reading of the CAD data requires matching of the coordinate system for the CAD data-derived image information with the coordinate system of the work 12. Then, a coordinate system setting for positioning is performed (S3).

For example, in the case herein considered, the origin of the work coordinate system is located on the center of a circular element 65 in the CAD data-derived image information 61 as shown in FIG. 5. In addition, the x-axis in the work coordinate system is coincident with a line that extends from the center of the circular element 65 to the center of a circular element 66. In this case, the circular element 65 is selected by a pointer 67 of the mouse 24 to execute an origin moving process. Subsequently, the circular element 66 is also selected by the pointer 67 of the mouse 24 to execute an x-axis setting process. As a result, the coordinate system for the CAD data-derived image information 61 can be coincident with the work coordinate system.

Next, setting of tolerance information necessary for tolerance checking between practically measured data and CAD data is performed (S4). In this setting, several types of tolerances can be treated. For example, as the upper and lower limit tolerances with respect to coordinate values, angles and distances, the upper limit tolerance and the lower limit tolerance are employed to set permissible ranges above and below a design value. In addition, as tolerance ranges, with respect to position deviation and shapes (straightness, circularity and so forth), tolerance zones are set. Further, tolerance information can be set for a fitting tolerance and others. The above tolerance information can be saved in a tolerance list.

Two setting methods are prepared to set the above tolerance information. One is of setting common tolerance information for all objective graphics to be measured, and the other is of setting tolerance information corresponding to design values according to normal tolerance files.

Next, an objective graphic is selected, for the purpose of a part program generation, from the CAD data-derived image information 61 displayed on the screen (S5). This selection operation can be performed as shown in FIG. 5, for example, by designating the rectangular region 68 that contains an objective graphic 64 to be selected, with a drag operation of the pointer 67 of the mouse 24 in the diagonal direction of the rectangle.

There are other methods of selecting objective graphics, which can be used properly in accordance with situations. For example, a method selects an objective graphic individually with inputting numerals or operating the mouse 24.

If the objective graphic 64 is selected, the CPU 35 selects and locates an edge detection tool for each selected objective graphic, based on the previously set generation condition on edge detection tools (S6). In this case, each objective graphic is converted into that in an image (video) coordinate system set in the imaging region 63. Therefore, the position and size of the tool is to be calculated in the image coordinate system.

In the image-measuring instrument, the entirety of an individual edge detection tool is necessarily contained within the imaging region 63 to execute an edge detection process. If a part of an individual edge detection tool is not contained within the imaging region 63, the edge detection is performed in a region that has no imaged data therein. This leads to an edge detection error, which interrupts the measurement or prevents measured results to be obtained.

As shown in FIG. 9, this embodiment sets such the largest determination circle 69 that can be contained entirely within the imaging region 63 (S7). Then, a possibility of an edge detection tool to be arranged is determined in relation to whether the selected edge detection tool can be contained within the determination circle 69 or not.

For example, as shown in FIG. 9A, a box tool is selected for a tool type in the above generation condition on edge detection tool. If this tool 73 cannot be contained within the determination circle 69, after alarm displaying, altering to a simple tool 71 that has been previously set as a next candidate (S9) as shown in FIG. 9B, the above determination is performed again.

If the edge detection tool employed for the next candidate can not be also contained within the determination circle 69, after alarm displaying, altering to another edge detection tool that has been set as a tertiary candidate, the above determination may be performed again.

If the edge detection tool employed for the next candidate can not be contained within the determination circle 69 again, a method of forcibly terminating the part program generation process, after alarm displaying, may also be applicable.

Thus, according to the method of determination in this embodiment, because the edge detection tool set for the next candidate can be contained within the determination circle easier than the previous candidate, the edge detection error at the time of part program generation can be eliminated.

Whether an edge detection error occurs or not can be determined from the fact that the edge detection tool is contained within the rectangular imaging region 63 or not. Though, as in this embodiment, further setting the determination circle 69 in the imaging region 63 and determining whether the edge detection tool is contained within the determination circle 69, the determination can be performed independent of the tilt of the work 12 located at the time of measurement. Namely, only required is to determine a distance between the center of the determination circle 69 and an end point of each edge detection tool. No rotational operation for the coordinate system, when the work is located at a tilt, is required.

Figure 10:
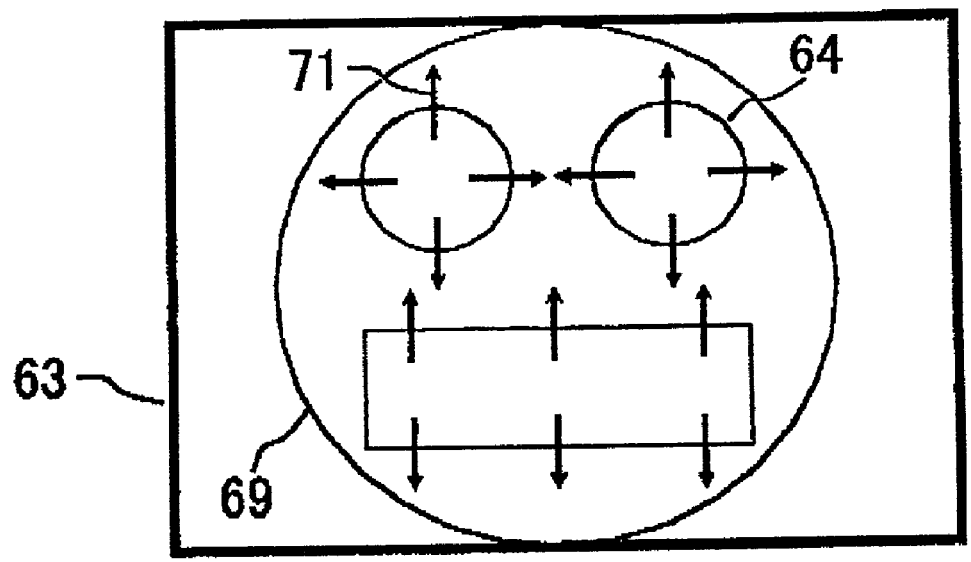
FIG. 10 illustrates process procedures in the image-measuring system according to the embodiment of the present invention.

Next, as shown in FIG. 10, the position of the imaging region 63 is determined, while the located edge detection tools 71 or 73 can be contained as many as possible within the located determination circle 69, to generate a stage movement command (S10). As for the edge detection tools all contained within the determination circle 69, a process for generating the stage movement command is omitted so as to perform edge detection without any stage movement (S11). A method of determining whether each objective edge detection tool can be contained within the determination circle 69 is applicable to the determination at the step S8. Another method of determining is also applicable to the determination at the Step S8. The method derives the minimum circumscribing circle using all objective edge detection tools and determines whether the minimum circumscribing circle is contained within the determination circle 69. If all objective edge detection tools are not contained within the determination circle 69, as shown in FIG. 11A, a stage movement instruction is described in a part program so as to locate a reference edge detection tool 74 on the center of the imaging region 63. For example, if edge detection tools are arranged from the upper left position to the lower right position in order, the tool 74 is, at first, an edge detection tool located at the most upper left position. Subsequently, as shown in FIG. 11B, a stage movement instruction is described in a part program to locate an edge detection tool 74 used for the next reference at the center of the imaging region 63 and the same operation is repeated.

Thus, a time required for measurement can be shortened through the edge detection, with omission of the stage movement command, without stage movements of graphic elements in the plurality of objective graphics. In particular, this effects on the case where plural graphic elements in objective graphics are located closer to each other.

Next, the CPU 35 generates other stage movement command, auto-focus command, illumination command, lens command, measurement command and tolerance checking command and adds them to the part program, then storing its part program file in the HDD 38 and the like (S12). As for the auto-focusing, an auto-focus condition is set previously. Namely, an auto-focus execution is set to define which condition is employed for auto-focusing. This condition is selected from auto-focusing once at the time of beginning the teaching; auto-focusing at the time of beginning a measurement of a new shaped element; auto-focusing after a stage movement instruction and auto-focusing when a stage moves to a position spaced a radius additionally designated or more from the previous auto-focused position. Further, a range or auto-focusing is set to avoid focusing on an excessive shallower or deeper position.

The auto-focus command is generated based on the above condition so as to perform auto-focusing when the condition is satisfied.

Figure 12:
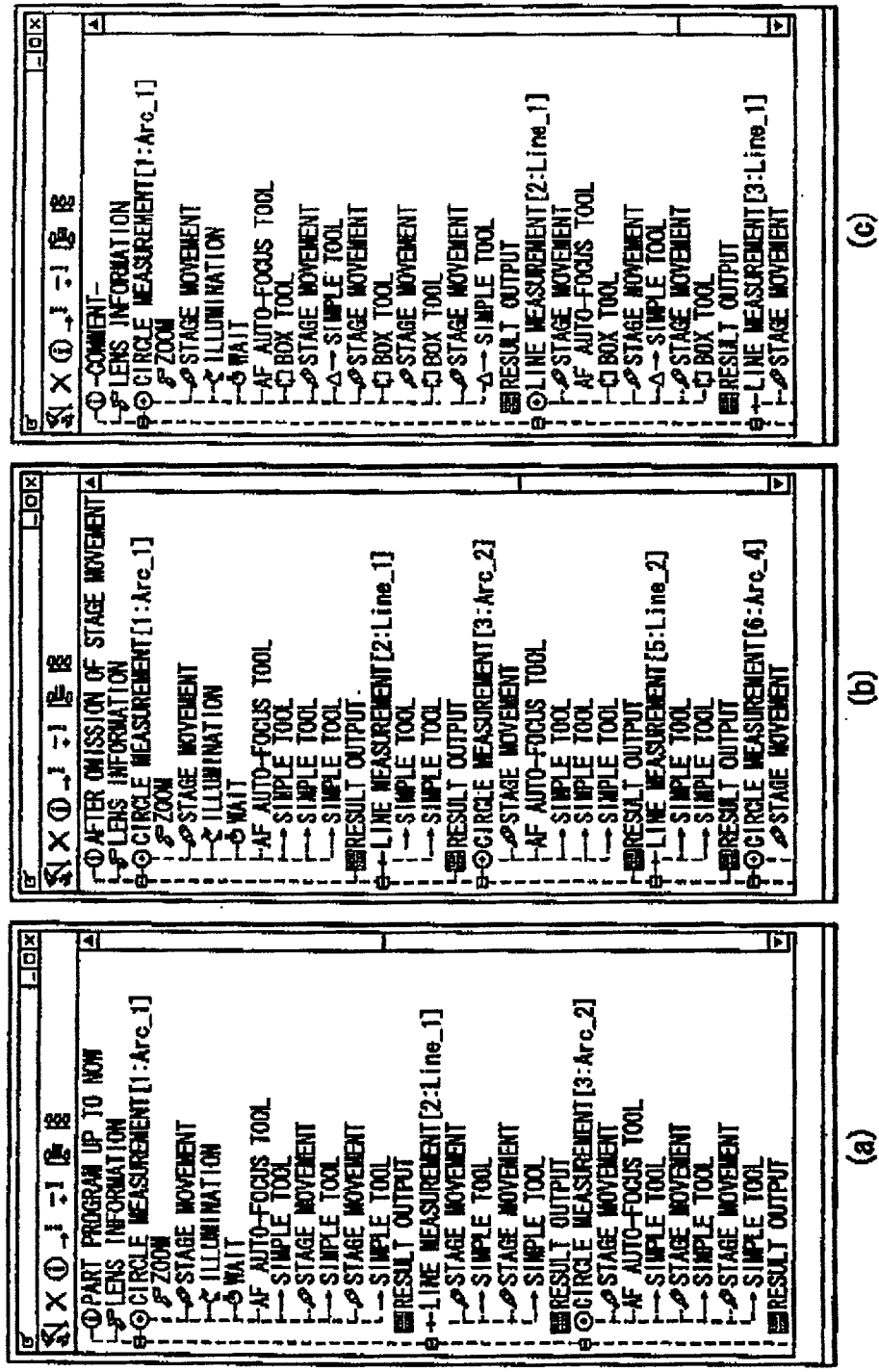
FIG. 12 illustrates the part program generated in the image-measuring system according to the embodiment of the present invention.

FIG. 12 shows an example of a part program generated through the above processes. FIG. 12A shows a portion of a part program generated on the basis of the conventional part program generation method, FIG. 12B shows a portion of a part program generated through the above omission of the stage movement command. The part programs in both figures are generated for the same work. In the conventional part program generation method, the number of the executions of the stage movement commands is equal to 8 during the processing of the part program. To the contrary, in the part program generation method according to the embodiment, it is reduced down to 2, that is ¼ the above. It can be confirmed from this effect that, according to the part program generation method in the embodiment, the time required for stage movement is reduced down to ¼ compared to the conventional method. As a result, the whole measurement time can be reduced when a non-contact image-measuring instrument is employed to perform a practical measurement.

In an example of a part program generation shown in FIG. 12C, an error occurs at the time of generation of a tool for circle measurement [1: Circle__1] and a mark Δ is added to indicate that the tool has been replaced.

A process for editing the generated part program file will be described next.

Figure 13:
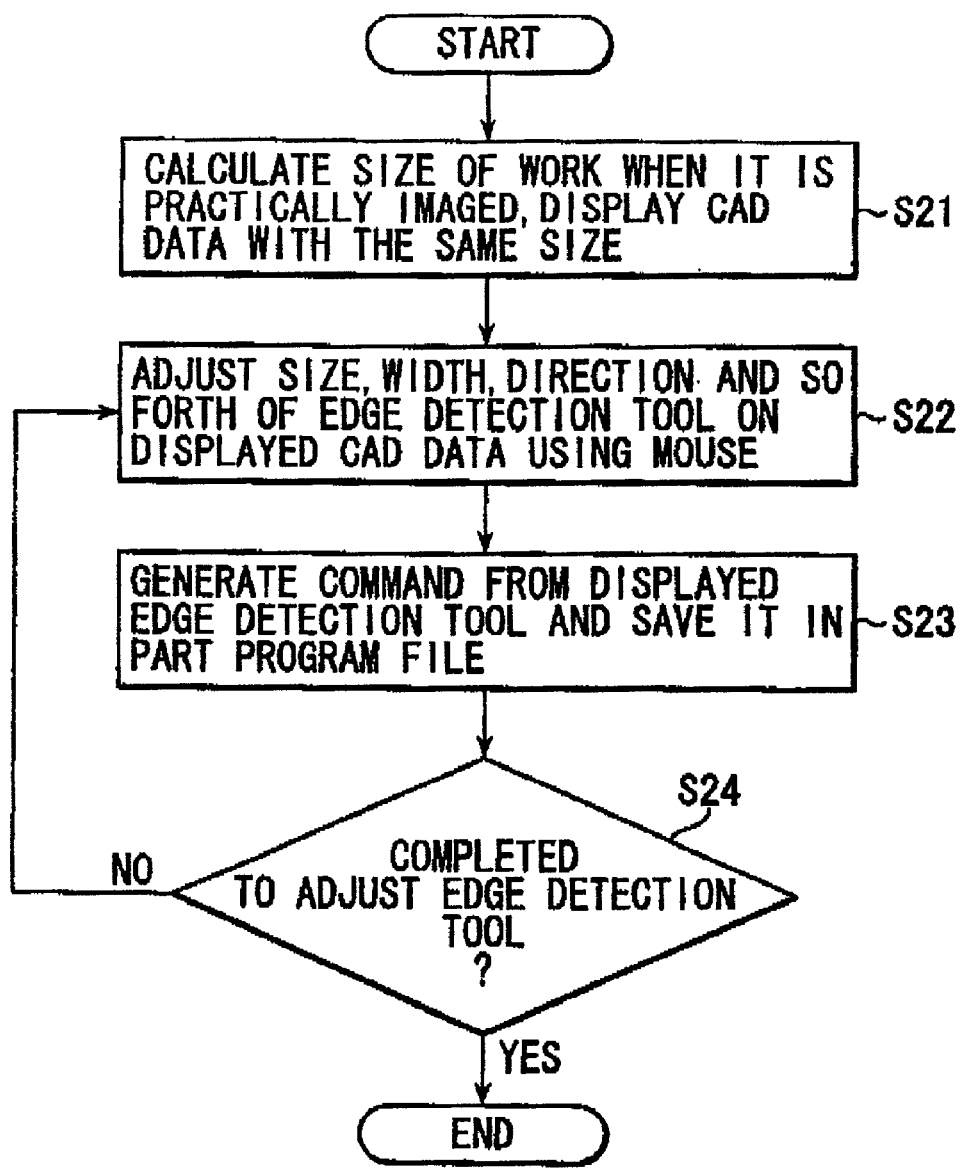
FIG. 13 is a flowchart showing process procedures in the image-measuring system according to the embodiment of the present invention.

FIG. 13 is a flowchart showing procedures, among edit processes executed at the part program editor 58, for adjusting edge detection tools.

In this embodiment, as shown in FIG. 12, the contents of the generated part program are indicated in a tree structure per command as zoom, stage movement, illumination and edge detection tool. When a necessary command is selected from the above, a dialog box for changing the setting in relation to the command is displayed. In addition, when an edge detection tool command is selected, a process of FIG. 13 is activated.

First, for the purpose of confirming situations of edge detection tools arranged, CAD data-derived image information is displayed with the same size as the work 12 when it is imaged practically (S21).

In this state, inputting numerals or dragging the mouse 24 for the edge detection tools displayed, modifications of the size, position, direction and so forth of the edge detection tool can be performed (S22).

If it is determined necessary to re-modify the modified part program, the process of modifying the edge detection tool is repeated successively to modify the part program. Through the modification processes (S22–S24) to generate edge detection tools that match the objective graphics, more efficient and accurate measurements can be performed.

By the way, if the part program generated from the above offline teaching contains CAD data, the image information generated from the image-measured results can be compared on an image basis to the image information as a design value obtained from the CAD data. Then, a process for displaying measured results using a part program that contains CAD data will be described next.

Figure 14:
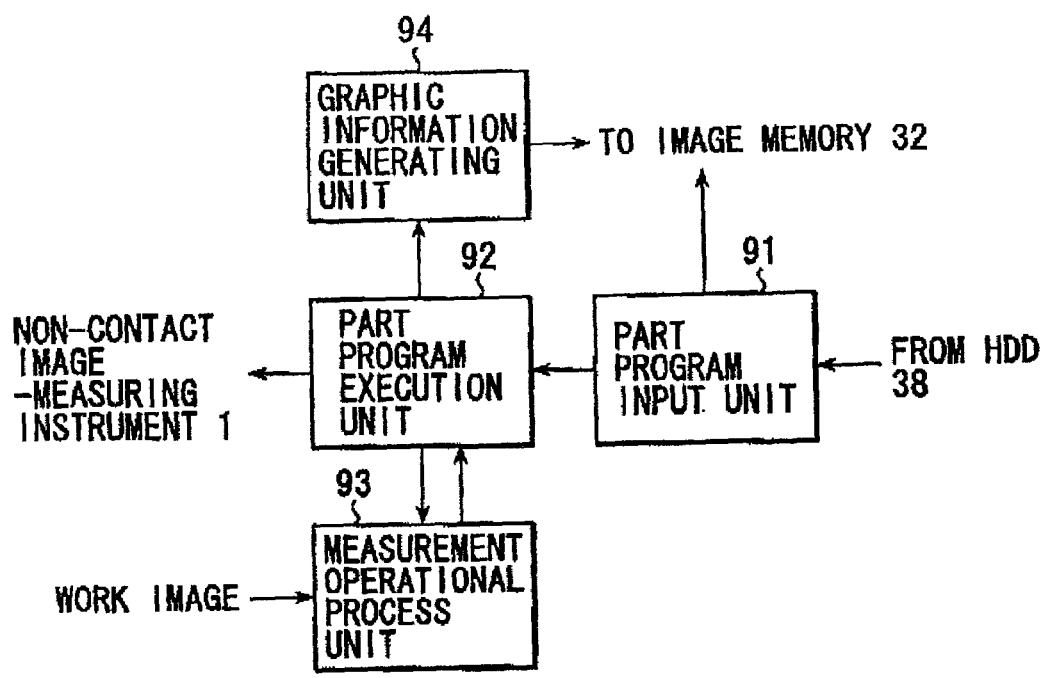
FIG. 14 is a functional block diagram showing an apparatus for displaying a measured result in the age-measuring system according to the embodiment of the present invention.

FIG. 14 is a functional block diagram of an apparatus, which comprises a program for a process of displaying measured results, the CPU 35 and its peripheral devices.

A part program file stored in HDD 38 is read in a part program input unit 91 and executed at a part program execution unit 92. A work image obtained from the non-contact image-measuring instrument 1 under control of measurement is subjected to operation processes at a measurement operational process unit 93 to obtain measured values required. A graphic information generation unit 94 generates graphics indicating measured results from the measured values obtained (for example, the center and radius of a circle) and sends them to the image memory 32. On the other hand, the part program file read in the part program input unit 91 is sent to the image memory 32. This is because the part program file also contains CAD data, from which graphics based on design values can be generated. These two graphics are displayed using different colors, for example, in a superimposed manner.

Figure 15:
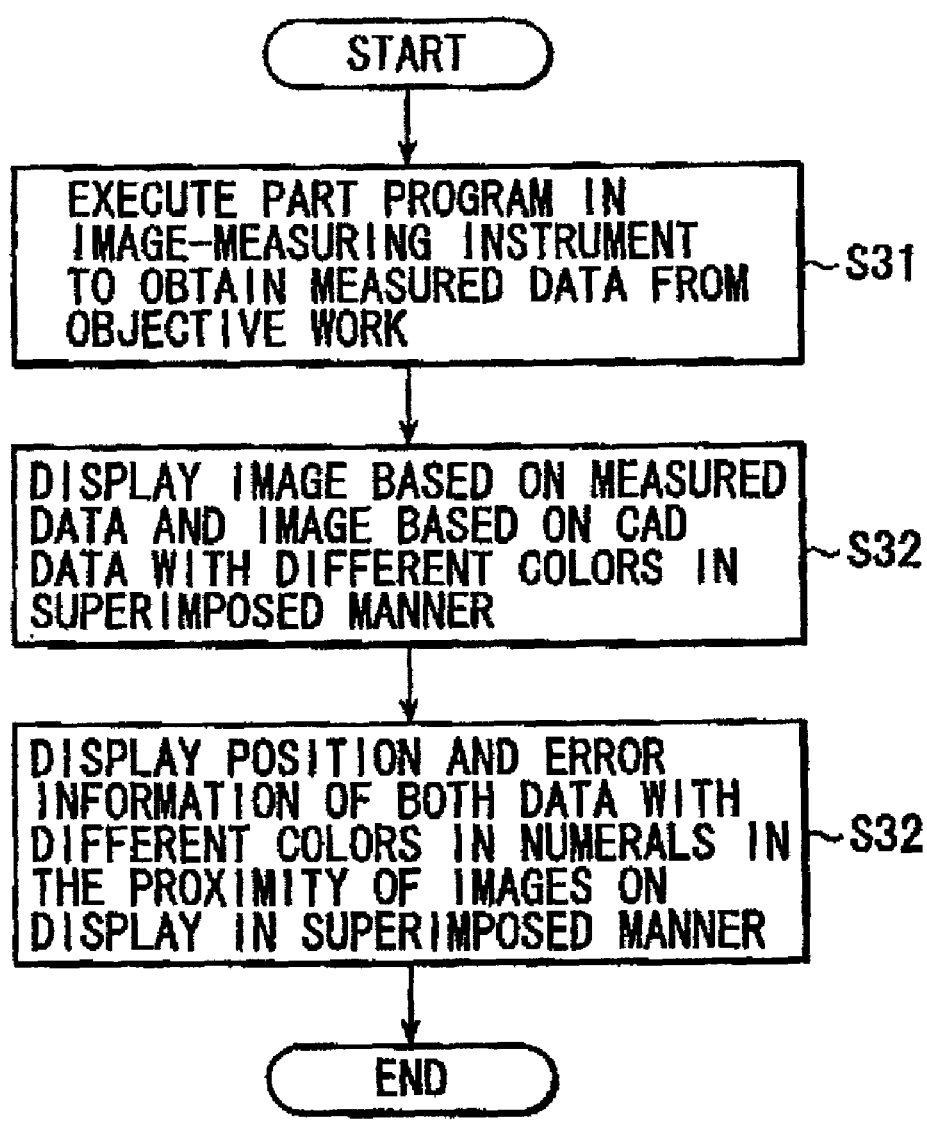
FIG. 15 is a flowchart showing process procedures in the image-measuring system according to the embodiment of the present invention.

FIG. 15 is a flowchart of a process of displaying measured results according to the above apparatus.

Figure 16:
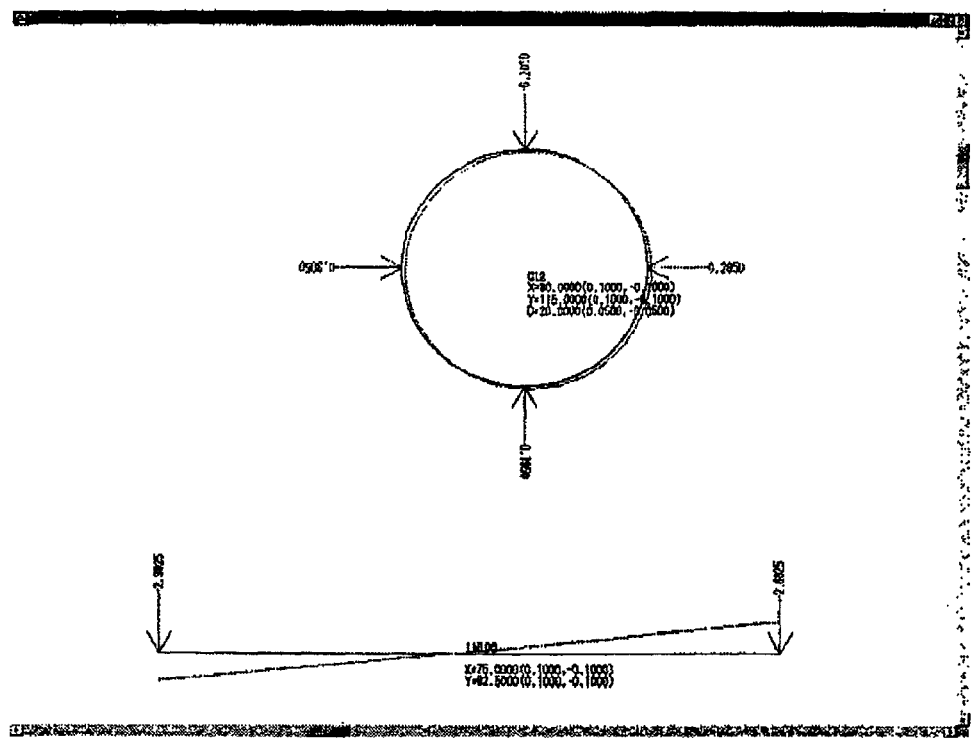
FIG. 16 illustrates functions in the image-measuring system according to the embodiment of the present invention.

First, the part program generated is executed using the non-contact image-measuring instrument 1 practically for imaging the work 12 to obtain measured data (S31). As shown in FIG. 16, an image based on the measured data obtained from the work 12 and another image based on the CAD data read are displayed in an image display region on the CRT display 25, in a superimposed manner with different colors (S32). Further, positional information and error information can be displayed with numerals superimposed in the proximity of the position of the objective graphic depicted on the display (S33). These expressions allow an operator to confirm measured results such as dimensional errors at a glance while in the conventional method dimensional values and error values of the measured results are only displayed as numerals on CAD display, resulting in a hardly visible state from concentrated numerals. The corresponding positions of the objective graphics on the display for displaying the positional information and error information with numerals are freely changeable.

Figure 17:
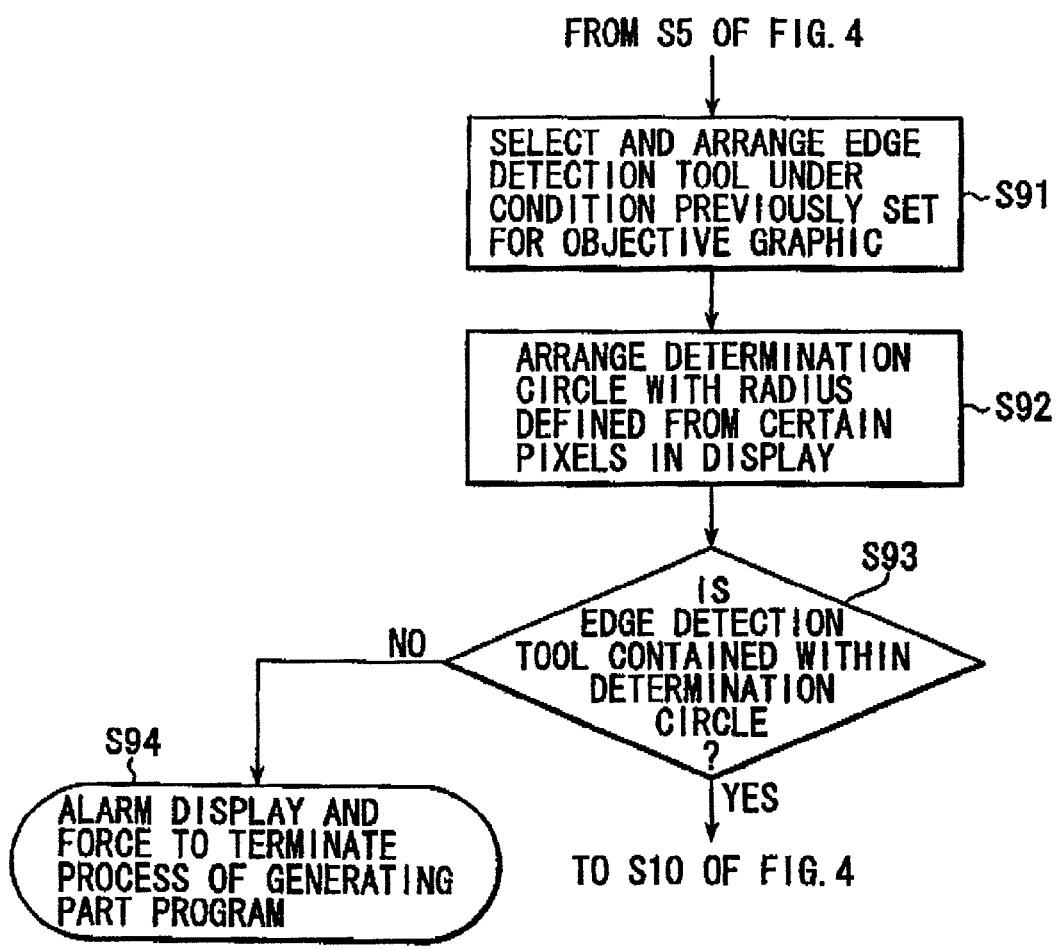
FIG. 17 is a flowchart showing process procedures in an image-measuring system according to another embodiment of the present invention.

It is not herein intended to limit the present invention only in the above embodiments. In the above embodiments, when an edge detection tool can not be contained within the determination circle, it is altered to another edge detection tool of a next candidate previously set, performing the determination again to improve flexibility and generality on generation of part programs. To the contrary, if an edge detection tool can not be contained within the determination circle, as shown in FIG. 17, the CPU 35 may alarm display on the CRT display, simultaneously forcing to terminate the process of part program generation (S94). Such the forced termination of the process of part program generation after alarming can avoid, through omission of useless part program generations, unreasonable measurement operations due to defective part program execution, and can prevent edge detection errors from occurring at practical measurements as far as possible.

In the above embodiments, examples of the part programs that are generated based on CAD data are described while part programs can also be generated on the basis of image data instead of the CAD data. For example, the image data includes one practically imaged by an image-measuring instrument or digital camera or one input from a scanner. Thus, even if no CAD data is present, a part program can be generated easily from data obtained from a scanner that reads a work. In the case of CAD data with ambiguous dimensions of the work, measurement of a practical diameter size on a part element shape (for example, a circle) in image data can compensate dimensions of the whole image data based on the measured size.

Further, the method of generating part programs for image-measuring instruments according to the present invention provides a method of offline generating part programs without the use of a real machine, though the method may also be performed in an image-measuring instrument. In this case, there is an advantage because image data obtained by the image-measuring instrument can be employed as such.

According to the present invention as described above, when a part program for use in an image-measuring system is offline generated automatically based on work data, an effect is caused because an operator can easily and efficiently generate a part program for a CNC image-measuring instrument without complicated operations.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An apparatus for generating a part program with description of measurement procedures to be used in an image-measuring instrument for measuring a work based on image data obtained by imaging said work, said apparatus comprising:
   a work data input means for reading work data of said work;
   a display means for graphically displaying said work data read by said input means;

a graphic selection means for selecting a graphic corresponding to an element to be measured in said work among said work data displayed by said display means;

a measurement condition setting means for previously setting measurement conditions containing a generation condition on an edge detection tool applicable to each graphic type; and a part program generation means for generating an edge detection tool corresponding to said each selected graphic based on said measurement conditions set in said setting means, and for generating a part program containing an edge detection command by said generated edge detection tool.

2. The apparatus for generating a part program according to claim 1, wherein said part program generation means determines a position and direction of said edge detection tool based on vector data of said each selected graphic, and determines a length and number of said edge detection tool(s) based on an edge detection tool generation condition with respect to that graphic.

3. The apparatus for generating a part program according to claim 1, further comprising an editing means for editing said edge detection tool placed by said generated part program, wherein said display means graphically displays said work data by the same magnification as that of an image to be imaged during an operation of editing said edge detection tool by said editing means.

4. The apparatus for generating a part program according to claim 1, wherein said measurement condition setting means sets tolerance information for tolerance checking per said element to be measured, and said part program generation means records tolerance information for tolerance checking in said part program based on said tolerance information set by said measurement condition setting means.

5. The apparatus for generating a part program according to claim 1, wherein said measurement condition setting means sets an auto-focus execution condition for allowing said image-measuring instrument to execute an auto-focusing operation, and said part program generation means records an auto-focus command in said part program based on said auto-focus execution condition set by said measurement condition setting means.

6. The apparatus for generating a part program according to claim 1, wherein said part program generation means sets a determination area, for generating an edge detection tool, in a display area for image information obtained by practically imaging said work, describing said edge detection command based on said generated edge detection tool in said part program only if an edge detection tool generated in accordance with said edge detection tool generation condition set by said measurement condition setting means is contained in said determination area, and alarm displaying and terminating to generate edge detection tools if said generated edge detection tool is not contained in said determination area.

7. The apparatus for generating a part program according to claim 1, wherein said measurement condition setting means sets primary and secondary candidates of edge detection tools generated per each graphic type as edge detection tool generation conditions, said part program generation means sets a determination area, for generating an edge detection tool, in a display area for image information obtained by practically imaging said work, describing said edge detection command based on said generated edge detection tool in said part program only if an edge detection tool generated in accordance with said primary candidate of said edge detection tool generation condition set by said measurement condition setting means is contained in said determination area, and generating said edge detection tool of said secondary candidate if said generated edge detection tool is not contained in said determination area.

8. The apparatus for generating a part program according to claim 1, wherein said part program generation means generates a part program, when a plurality of edge detection tools are contained in a certain determination area set in a display area for image information obtained by practically imaging said work, so as to allow said plurality of edge detection tools to successively execute edge detection commands without any stage movement in said image-measuring instrument.

9. The apparatus for generating a part program according to claim 8, wherein said part program generation means generates a part program containing a stage movement command that allows the greatest number of edge detection tools to be contained in said determination area.

10. The apparatus for generating a part program according to claim 1, wherein said work data comprises CAD data of or image data of said work.

11. A method of generating a part program with description of measurement procedures to be used in an image-measuring instrument for measuring a work based on image data obtained by imaging said work, said method comprising:

reading work data of said work;

graphically displaying said work data read;

generating an edge detection tool, for a graphic corresponding to an element to be measured in said work selected by a selection operation among said work data displayed, based on said measurement conditions containing a generation condition on an edge detection tool applicable to each graphic type previously set; and generating a part program containing an edge detection command by said generated edge detection tool.

12. A medium for recording a part program generator for generating a part program with description of measurement procedures to be used in an image-measuring instrument for measuring a work based on image data obtained by imaging said work, said part program generator comprising the steps of:

reading work data of said work;

graphically displaying said work data read at said step of reading;

selecting a graphic corresponding to an element to be measured in said work among said work data displayed at said step of displaying;

previously setting measurement conditions containing a generation condition on an edge detection tool applicable to each graphic type; and generating an edge detection tool corresponding to said each selected graphic based on said measurement conditions set at said step of setting, and generating a part program containing an edge detection command by said generated edge detection tool.

13. A program stored on a computer readable medium for generating a part program with description of measurement procedures to be used in an image-measuring instrument for measuring a work based on image data obtained by imaging said work, said part program generator comprising the steps of:

reading work data of said work;

graphically displaying said work data read at said step of reading;

selecting a graphic corresponding to an element to be measured in said work among said work data displayed at said step of displaying;

previously setting measurement conditions containing a generation condition on an edge detection tool applicable to each graphic type; and generating an edge detection tool corresponding to said each selected graphic based on said measurement conditions set at said step of setting, and generating a part program containing an edge detection command by said generated edge detection tool.

14. An image-measuring instrument for measuring a work based on image data obtained by imaging said work, comprising:

a part program input means for reading a part program with description of measurement procedures containing CAD data corresponding to said work;

a part program execution means for executing said part program read by said part program input means to obtain a measured result for each element to be measured in said work;

a graphic information generation means for generating graphic information of said measured result for each element to be measured, based on said measured result obtained by said part program execution means; and a display means for displaying graphic information of said measured result generated by said graphic information generation means and graphic information as a design value in the corresponding CAD data, superimposing them in an identifiable form.

15. The image-measuring instrument according to claim 14, wherein said display means numerically displays, in the proximity of said graphic information of said measured result and said graphic information as said design value, error information on both graphic information.

16. A method of displaying a measured result from an image-measuring instrument for measuring a work based on image data obtained by imaging said work, comprising:

executing a part program with description of measurement procedures containing CAD data corresponding to said work to obtain a measured result for each element to be measured in said work;

generating graphic information of said measured result for each element to be measured, based on said measured result; and displaying graphic information of said measured result and graphic information as a design value in the corresponding CAD data, superimposing them in an identifiable form.

17. A medium for storing a program of displaying measured results from an image-measuring instrument for measuring a work based on image data obtained by imaging said work, said program comprising the steps of:

reading a part program with description of measurement procedures containing CAD data corresponding to said work;

executing said part program read at said step of reading to obtain a measured result for each element to be measured in said work;

generating graphic information of said measured result for said each element to be measured, based on said measured result obtained at said step of executing; and displaying graphic information of said measured result generated at said step of generating and graphic information as a design value in the corresponding CAD data, superimposing them in an identifiable form.

18. A program stored on a computer readable medium for displaying measured results from an image-measuring instrument for measuring a work based on image data obtained by imaging said work, said program comprising the steps of:

reading a part program with description of measurement procedures containing CAD data corresponding to said work;

executing said part program at said step of reading to obtain a measured result for each element to be measured in said work;

generating graphic information of said measured result for each element to be measured, based on said measured result obtained at said step of executing; and displaying graphic information of said measured result generated at said step of generating and graphic information as a design value in the corresponding CAD data, superimposing them in an identifiable form.

* * * * *